Sept. 23, 1941.    J. H. HERZOG    2,256,477
WINDOW WIPER
Filed Dec. 16, 1938    2 Sheets-Sheet 1

INVENTOR
JOHN H. HERZOG
BY
ATTORNEY

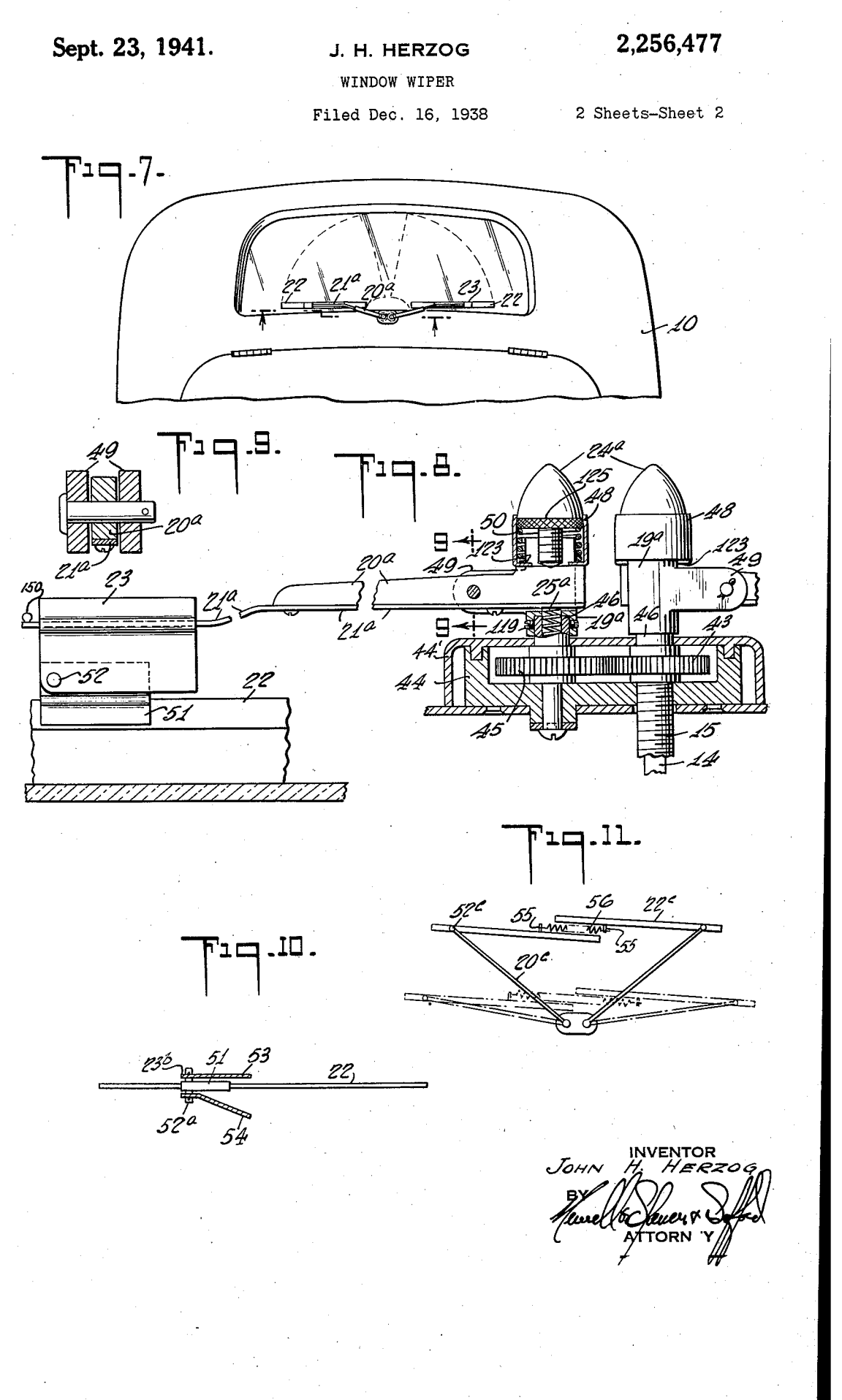

Sept. 23, 1941.  J. H. HERZOG  2,256,477
WINDOW WIPER
Filed Dec. 16, 1938  2 Sheets-Sheet 2

Patented Sept. 23, 1941

2,256,477

UNITED STATES PATENT OFFICE 2,256,477

WINDOW WIPER

John H. Herzog, Brooklyn, N. Y., assignor to The Sleetex Company, Inc., New York, N. Y., a corporation of New York Application December 16, 1938, Serial No. 246,058

6 Claims. (Cl. 15—255)

This invention relates to a window wiper and particularly to a motor driven device for wiping windows of automobiles and the like.

It was already standard practice prior to my invention to provide motor driven squeegee devices on automobile windshields. Such devices usually take the form of a reciprocating torque motor, vacuum operated or electric, a spring arm on the motor shaft extending radially therefrom over the windshield, and a squeegee blade connected to this so-called "wiper arm" and pressed by the wiper arm into contact with the surface of the windshield. The wiper arm swings back and forth against the glass, and the squeegee blade is thus moved laterally to wipe the glass free of rain drops, etc.

The device of my present invention is designed particularly to be suitable for use in cleaning the rear windows of automobiles and the like. For this purpose the ordinary type of windshield wiper has not proven satisfactory. For one thing, due to its greater distance from the driver's eye and the angle of vision, it is important to have a relatively wide area clear to the view of the driver. Because of the relatively low windows commonly used at the rear often this cannot be satisfactorily secured by the ordinary swinging arc squeegee. The problem is further complicated by the fact that a stanchion or mullion is ordinarily used between the panes of a double window in the rear. If wipers swinging in a 180° arc were used on each pane of a double window, it would result in two small areas being cleared, the radius being limited by the window height, while a relatively large more or less triangular patch in the center would remain obscured.

I have found by observation of numerous drivers and under various conditions of driving that the requisites of safe driving, so far as rear windows are concerned, are to have areas of sufficient height and width to give at a glance the full width and a relatively long distance along the road, but that it is not essential that this scope should be covered in a single area. In fact it is a commonly occurring condition that a space near the center of the window will be obstructed by the head of a passenger. Since the driver is relatively close to the rear-view mirror the driver avoids such an obstruction easily and instinctively by a slight movement of his head. The wiper of my present invention is in part based upon this observation and I have, therefore, designed it to wipe areas of sufficient width, at a given height corresponding to the maximum distance of vision required for safe driving, and I may even allow an intermediate area or areas to remain obscured, provided that such area is not of greater width than can be covered in the rear view mirror by a natural movement of the observer's head.

Moreover, it has been found that a motor mounted at the edge of the rear window results in a vibration so close to the ears of the passengers as to be highly annoying and objectionable.

Accordingly, it is an object of the present invention to provide an automatic wiper which is adapted to clear a relatively wide area of a window.

Another object of the invention is to provide a wiper which clears the maximum area where it is most effective for vision of traffic areas which will affect the driving of a vehicle.

Another object of the invention is to simultaneously wipe clear two adjacent panes of a mullioned window.

Another object of the invention is to provide a window wiping device in which the motor is removed from the windowed space, and annoyance to the occupants in such space is thereby avoided.

Another object of the invention is to provide a squeegee mounting which is secure against bouncing and "kiting" away from the glass when the car is travelling at high speed, and which is adjustable to exert a limited resilient pressure adapted to give the best wiping.

Another object of the invention is to provide a wiper which may be readily adapted to and used on the various standard automobiles.

Another object of the invention is to provide a device for simultaneously wiping the interior and exterior of a window.

Other objects and advantages of the invention will be apparent to those skilled in the art from the following description and the accompanying drawings.

In these drawings and the attached specification I have shown a preferred embodiment of my invention and described and suggested various alternatives and modifications thereof. These are not intended to be exhaustive nor limiting of the invention, but on the contrary are chosen for purposes of illustrating the invention and the manner of its application to practical use and explaining the principles thereof so that others skilled in the art may be able to utilize and embody the invention in numerous forms and with various modifications, each as may be best adapted to conditions of the particular use.

In these drawings:

Fig. 7 is a rear view in rear elevation similar to that of Fig. 1 but of another embodiment and showing the range of movement of the wiper mechanism diagrammatically in broken lines;

Fig. 8 is a horizontal section taken on line 8—8 of Fig. 7;

Fig. 9 is a sectional view taken on line 9—9 of Fig. 8;

Fig. 10 is a detail view showing the connector device by which the wiper blade is secured to the wiper arm;

Fig. 11 is a diagrammatic view showing an alternative wiper blade arrangement which may be used in place of that shown in Figs. 7 and 8.

Figure 1:
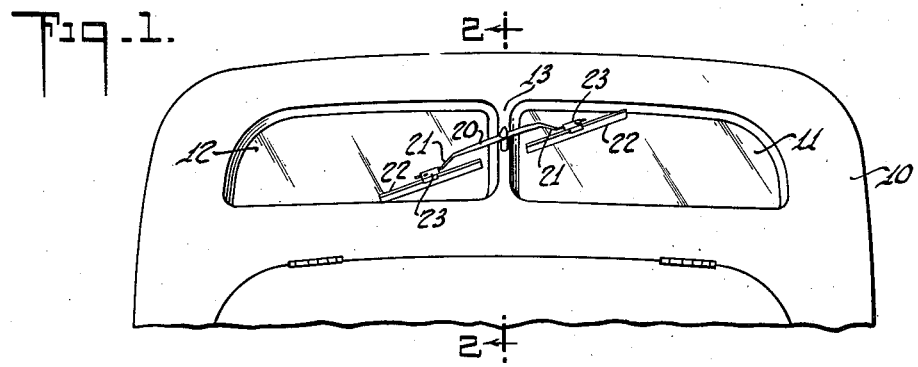
Fig. 1 is a rear elevation of an automobile equipped with a wiper embodying my invention.
Figure 2:
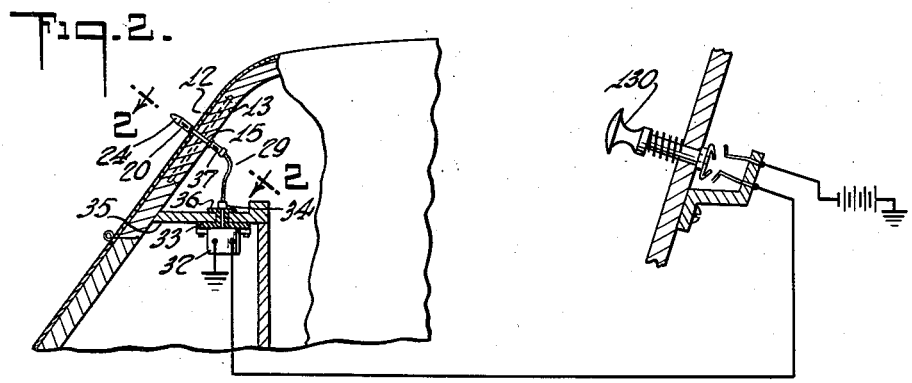
Fig. 2 is a vertical section taken on line 2—2 of Fig. 1.
Figure 3:
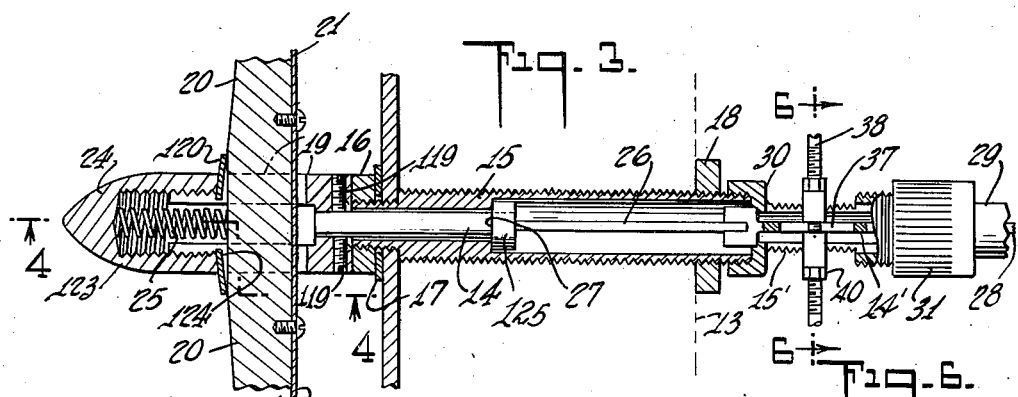
Fig. 3 is a detail view in axial section on an enlarged scale showing the portion of the mechanism as shown in Fig. 1, which is attached to and passed through the mullion between the window panes.
Figures 4, 5, 6:
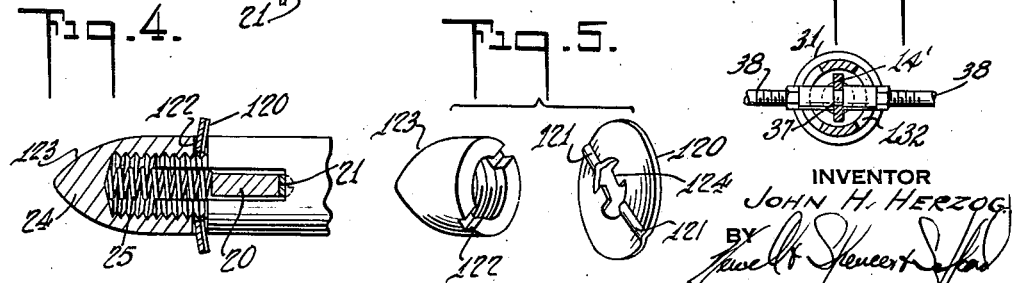
Fig. 4 is a detail view in section taken on line 4—4 of Fig. 3.
Fig. 5 is a view in perspective of the adjusting nut and locking washer shown in Fig. 4.
Fig. 6 is a detail fragmentary view in section taken on line 6—6 of Fig. 3.

Referring first to Figs. 1 to 3 inclusive, the automobile body 10 is provided with a double window having panes 11 and 12 separated by a mullion 13. Through the center of this mullion a wiper drive shaft 14 is extended and its tubular housing 15 is secured to the mullion, e. g., by clamping the shoulder on the housing against the mullion 13 by means of the clamping nut 16, preferably with a rubber washer 17 beneath it. A nut 18 or other suitable means secured on the inner end of the housing 15 provides an ornamental finish and anchorage for the housing at the interior of the body.

On the outer end of the shaft 14 is secured by opposed set screws 119 a slotted connector head 19, in the slot of which is mounted a walking beam 20, which is provided at its ends with spring arms 21. A spring washer 120 is provided, in the preferred example, which has ridges or humps 121 on upwardly arched portions to engage in the key slots 122 of the cap nut 24 and keys 124 which engage in the slot of the connector head 19, whereby the nut is held releasably in any position of adjustment for controlling the tension of the spring 25.

In the present case these arms 21 are integral, extending from end to end as a single spring strip re-enforced at the center by the rigid walking beam portion 20. To each of the spring arms 21 a wiper blade 22 is secured by means of the connector 23. A cap 24 is secured on the end of the connector head 19 to close the slot and hold the walking beam in operative position and advantageously the slot as thus closed leaves substantial play to the walking beam so that it can rock freely in the head 19; and a spring 25 is provided to press the walking beam towards one end of the slot and hold it against rattling in the slot.

The shaft 14 as shown in this example is made with a narrower outer portion, so that it and the surrounding tubular housing 15 can be passed through a relatively small hole in the mullion 13; whereas, the inner end of this shaft is flat and wider as shown at 26 and the part of the housing 15 around it is correspondingly wider. Between the two parts of the housing 15 a shoulder 27 is formed in the bore which cooperates with the collar 125 to serve as a thrust bearing to hold the shaft 14 against the pressure of the spring arm 21 acting against the wiper blade 22 on the glass 11 and 12. A corresponding shoulder on the outside of the housing 15 bears against the inside of the mullion to clamp the housing in position as already described.

The shaft 14 may be made, for example, from a rod flattened at one end to form the wider flat portion, and with the collar 125 slipped over the smaller end and pressed onto the part which is widened as it is first flattened. A similar shaft may be made from a flat strip turned down at one end to form the narrower portion or from a rod of diameter suitable for the narrow portion welded or otherwise connected to a portion of wider flat strip. Even the narrower portion may have some flattened area along one side to make more secure engagement with set screws as hereinabove described.

The ends of the housing 15 respectively are threaded for a considerable distance from the ends and as both the tubular housing and the shaft 14 are made a little longer than will ordinarily be required, the same standard construction can be used in any automobile regardless of the exact length required. When the device is installed, the exact length is determined and the excess length then cut off by means of a hack saw, or in any other suitable way. The inner end may be cut through, leaving the end of the housing 15 and the ends of the shaft 14 substantially flush, but at the outer end the housing is cut a little shorter than the shaft 14 so that the latter may be engaged by the head 19.

A flexible shaft 28 in a flexible housing 29 may be secured to the shaft 14 by means of a slotted coupling. The exterior of this coupling member may be cylindrical and substantially fitted to the inside of the tubular housing 15, while the slot therein is substantially fitted to the end of the flattened shaft portion 26, and thus when the projecting part of the slotted coupling is extended into the tubular housing a secure drive connection is established between the flexible shaft and the wiper shaft 14. A ring nut 31 or other suitable coupling member serves to couple the flexible housing 29 to the tubular housing 15.

In its preferred embodiment, as shown, a slotted intermediate housing 15' slotted at 132 and having an internal threaded end portion 30 to engage the threaded housing 15 is provided with a flat shaft 14' slotted at one end to engage the shaft 14 and cut out at 37 for reception of the wiper arm 38 which operates in the holes 132. This wiper arm 38 preferably consists of a stiff spring wire extended through the hole 37 to form spring arms, each of which is provided at its end with a felt wiper blade (not shown) which together serve to wipe "sweat" or condensation from the inside of the window. Nuts 40 on the arms 38 in the slots 37 serve to hold the wiper arm 38 positioned, and the resilient tension of the arms 38 serve to press the wiper blades against the glass.

The wiper mechanism may be driven by any suitable reciprocating torque motor such as has been commonly used heretofore for operating windshield wipers, except that its angle of operation is smaller. This motor, according to my invention is placed in a compartment separate from the passenger space of the automobile. In the case shown, the trunk compartment at the rear of the car is used for this purpose; and, as shown, the motor 32 is mounted on vibration absorbing, e. g., rubber feet, 33 on the under side of the upper partition of this compartment. The flexible shaft 28—29 is inserted through a hole in the compartment partition and is held coupled to the motor by the nut 34 which in turn is insulated from the partition 35 by the rubber washer 36 so that any vibration created by the operation of the motor is not transmitted to the partition 35 or to other parts of the car body and, therefore, does not produce objectionable noise or vibration perceptible to the passengers.

It will be observed that this device as just described is extremely flexible so that it may be fitted to any of the standard makes of cars. As already described, the shaft 14 and housing 15 are sufficiently narrow at their outer ends so that they can be inserted through any stanchions or mullions used in standard practice. The ends of this shaft and housing are made so that they can be cut off to any desired length to fit any body construction and the same construction is used for the shaft of the motor 32 and its housing where they project through the compartment partition so that this also may be cut to any required length; and, by reason of the use of the flexible shaft, the motor may be placed at any convenient position and the reciprocating torque transmitted through the flexible shaft to the wiper mechanism proper. Obviously, the flexible shaft may be of a type which is readily cut to meet the requirements of each particular installation or a variety of lengths may be provided and small differences can be taken up by shifting slightly the position of the motor. So far as the cars to which this device is applied is concerned the only change which is necessary is the drilling of a hole through the mullion between the window pane and the drilling of the hole through the partition at the top of the trunk compartment.

Although any of numerous types of flexible shafts may be used, I have found it advantageous to use inverse wound steel springs (nested coils one wound on a right-hand spiral and one on a left-hand spiral); this provides a limited "whip" which is desirable for accommodating certain variations in window sizes and shapes. The "balloon" type squeegee blade which I use in my preferred embodiment will strike the edge of the window without injury and the coiled spring shaft permits the motor to complete its cycle even if the window is very low. With other types of blades a stop for the wiper arm may be used. By "balloon" blade I mean the type of blade which is formed of tubular rubber stock, or which is formed by looping a strip of rubber and holding both edges of the loop in the rigid back. This type of blade is well known in the art, and is widely used as a substitute for the ordinary flat strip of rubber.

Assuming that an electric motor is used, there will, of course, also have to be wiring connected to the battery and preferably to a switch 130 on the dash-board. This switch is advantageously of the type shown, by which a momentary touch contact may be made or a snap connection at the option of the driver. Thus, if the driver wishes to change the position of rest of the wiper blades when not in use, the so-called "parking position," he can do so accurately by merely touching the contact, whereas, if it were snapped on, the motor might operate too far before it could be snapped off. The use of the balanced "walking beam" construction allows the driver to choose at will the position of rest; gravity will not pull the arms down.

In the operation of this device the switch would be turned on by the driver when the rear window becomes clouded, whereupon the shaft will be reciprocated through an arc sufficient to move the wiper blades approximately across the height of the rear window. This will clear a substantial width on each side of the central mullion, through which the road to the rear will be visible in the rear view mirror, or directly if the driver should turn his head.

It will be observed that the wiper blades in the embodiment of my invention shown in Fig. 1 operate in a substantially horizontal position but in the lowermost position are tilted sufficiently so that any water collected above them will tend to drain off. This action can be improved and a more complete wiping effected if the wiper blades are connected by a special clip as shown in Fig. 10 having a loose connection on the pin or boil 52a and ears 53 and 54 for limiting angular movement of the blades 22 between them as will be more fully described below, except that for use with the walking beam pivoted at the center of the window the ears 53 and 54 would have to have their angles adjusted to bring the blades 22 parallel respectively to the top and bottom edges of the window.

In Figs. 7, 9 and 11 I have shown views similar to Figs. 1-6 of an automobile provided with a single pane rear window, and in this case I have provided a geared double arm wiper device in which each of the arms swings through an arc from approximately horizontal to nearly vertical.

The construction in this case up to the inside of the body adjacent the window may be substantially the same as in the case described in connection with Figs. 1 to 6 inclusive. In this case, however, since there is no mullion, the shaft 14 and the housing 15 are brought through the body just below the center of the window and in this case, instead of directly connecting the walking beam wiper arm on the end of the shaft 14, the gear 43 is connected thereto in the gear box 44; and it in turn meshes with another gear 45. Each of the gears 43, 45 is provided with a hollow stub shaft 46 projecting through the gear box cover 44' and to each is secured a slotted connector head 19a by means of set screws 119.

A rigid arm 49 is extended from one side of each of the heads 19a and on the outer end of each is pivoted the wiper arm 20a and the spring arm 21a. The latter is extended through the slotted head 19a into engagement with the spring 25a and at its other end extends into engagement with the wiper arm to transmit the pressure of the spring 25a for pressing the wiper blade 22 against the window. A screw cap 24a is used in this case to limit the movement of the arm 21a in the slot by the spring 25a and thus to limit the extent to which the wiper blade may be collapsed against the glass, although the cap 24 as shown in Fig. 2 may be used with a male thread on the head 19a similar to that of the head 19. This permits the use of stronger spring pressure better able to hold the wiper blades against bouncing and wind pressure without adversely affecting the operation of the blades, since the stronger spring action is stopped before the wiper blade is collapsed.

A dust and locking cap 48 serves yieldably to lock the screw cap 24a in its adjusted position. This cap is crimped over the screw cap 24a and milled or otherwise roughened on its inside to engage the roughened band 125 and at its lower edge has a narrow portion 123 turned into the slot approximately in line with the bottom of the screw 24a. This turned in part both leaves room for the action of the arm 21a and locks the cap against turning by engaging in the slot of the head 19a and also engages a spring 50 by which the cap is pressed down into engagement with the milled or knurled band 125. With this arrangement the pressure on the wiper blades may be adjusted while the device is in operation so as to give the best results.

The wiper arms 20a extend at an angle over the window away from the center as shown, and the arms 21a are formed with a band such that the blades 22 may be "parked" along and aligned with the lower edge of the window. The wiper blades 22 are connected to the wiper arms by the special clips 51 designed to permit adjustment by sliding along the back of the blade 22, and by the spring clips 23 which engaged the arms 21a so as to be held frictionally by spring pressure but slidable thereon. A stud 150 at the end of the arm 21a secures the clip 23 against being pulled off completely. The clips 51 and 23 are pivotally connected by the cotter pin or bolt 52.

In operation this device is similar to that first described excepting that instead of the walking beam action, which was designed particularly to equalize any action due to angular relation of the two window panes, in this case we have the two arms swinging angularly toward and away from one another, thereby wiping the blades 22 up and down across the window surface near its center.

If more complete wiping of the window from edge to edge is desired clips 23b may be used as shown in Fig. 10, which permit limited angular movement between the wiper arms and blades. In this clip the pin 52a is made to give a loose fit in the clip 51 so as to allow angular movement. The clip 51 is moved beyond the center of the blade 22 so that the drag of the blade about the clip 51 is unbalanced and tends to move the blade to an angular position limited by the ears 53 and 54 respectively. The ear 53 is designed to align the blade 22 with the bottom edge of the window when the arm 20a is at the bottom of its swing and the ear 54 is designed to align the blade with the top edge of the window. As the arm moves up, the longer end of the blade 22 lags behind bringing it against the ear 54, and thus when it reaches the top the blade is parallel to the horizontal edge of the window. On the downward stroke the end again lags behind against the ear 53. In this way the wiper blade will be parallel to the edge of the window both when it reaches the top and when it reaches the bottom of its stroke and can, therefore, wipe the window clean substantially throughout its complete height. The clip shown in Fig. 10 is designed particularly for the wiper mechanism of Figs. 7–9, but may be easily adapted to any other wiper, if the ears 53—54 are given angular positions which are determined by the angle between the wiper arm and the edge of the window when the blade is at the bottom and top respectively.

Preferably the wiper arms are adjusted so that one moves to a slightly higher level than the other, or the wiper blades are angularly positioned on the arms so that the end nearest the center of one of the blades will always move a little higher than the center end of the other blade as shown, for example, in another embodiment by Fig. 11. With this arrangement the blades may overlap at the top so that substantially the entire center portion of the window may be wiped; whereas, if the blades are made to clear one another at the top, due to the arcuate travel of the wiper arm they spread apart as they move downward and leave a more or less triangular patch unwiped at the center of the glass. Moreover, if a blade kept horizontal were used there would be a tendency for an excessive amount of water to collect above the blade, whereas, with this tilting action, water tends to drain off from the lower end at the bottom of the window and down the outer edges and the center of the window when the blade is moved down and up respectively and is tilted first in one direction and then in the other. In Fig. 11, I have shown another arrangement using more nearly horizontal blades, but overlapped. In this case each blade 22c is pivotally connected at 52c to the wiper arms 20c. Each blade 22c is provided with a stud 55 to which a light spring 56 is connected. This spring serves at once to keep the blades horizontal and to overlap their ends. The arms 21c being connected near the outer ends of the blades move very nearly vertically and, therefore, very little stretching of the spring is required.

It will be observed that in these embodiments of the inventions, the wiper blades are approximately horizontal and are moved up and down across the window by a swinging arm the direction of movement of which is predominantly vertical throughout its limited arc of swing. This, although not absolutely essential, I believe to be important in securing the greatest advantage from my invention.

Experience has shown that, when driving in rainy weather, particularly with the streamlined bodies now in common use where the rear window is at an angle to the vertical and the driver is seated in a position where it is not practical for him to lean his head out of the car to observe the road behind him, there is a very serious hazard, due to the collection of rain or snow and the spray of mud or dirty water thrown up by tires of other vehicles settling upon this rear window. This hazard the device of my present invention cures for the first time and is, therefore, of great importance to the safety of the motoring public.

What I claim is:

1. A window wiper for the rear windows of an automobile with a double window having closely spaced panes, with their surfaces at an angle and a narrow mullion between and with a compartment near the window partitioned from the main interior space occupied by the driver and passengers, which comprises a reciprocating torque motor, a flexible drive shaft, means coupling one end of said shaft to the motor for transmitting the reciprocating torque therefrom, a flexible housing for said flexible shaft, a slotted coupling at the end of said shaft nearest the window projecting beyond the housing, a tubular housing having a slender portion adapted to extend through the mullion between the windows and having a larger bore at its inner end adapted to receive the slotted projecting coupling, means for coupling the flexible housing and said tubular housing, a shaft in said tubular housing which has a flat strip portion of width approximating the larger inside diameter of the tubular housing, whereby to be rotatable in said housing as a bearing, and of thickness approximating the width of the slot in said slotted coupling, whereby it may fit directly into said coupling for driving connection therewith, and the end thereof being approximately flush with the end of the tubular housing, whereby said slotted coupling may extend beside it into the tubular housing and be held in coupled relation thereby, and having a shoulder thereon adapted to engage the end of the more slender portion in said bore of the tubular housing, whereby to form a thrust bearing against which the spring pressure of the wiper may operate, and which has a slender portion projecting through said slender portion of the tubular housing and beyond its outer end, a slotted coupling on the outer end of said last-named shaft a walking beam in said slotted coupling and adapted for rocking motion therein to accommodate the angular differences of the window panes in a wiping arc, spring arms extending at opposite ends of the walking beam, a spring urging the walking beam to the bottom of its slot, and window wiper blades flexibly secured to the ends of the spring arms, whereby to be wiped across the window and resiliently pressed thereagainst by the arms.

2. A window wiper for the rear windows of an automobile having a compartment within its body near the rear window, said window having panes angularly positioned relative to one another, which comprises a motor positioned in the compartment, a flexible shaft and housing therefor extended through the compartment near the window and through the wall of the body near the window, a wiper arm mechanism connected to the end of the flexible shaft extending over the outside of said window and comprising a walking beam with an end over each of said panes, means resiliently pressing the wiper blades from the walking beam toward the surfaces of the window panes but adapted to be equalized by rocking movement relative to the end of the shaft, and wiper blades connected to the ends of said walking beam.

3. A window wiper for an automobile having a rear window with panes thereof at an angle relative to one another, reciprocating torque driving means having a torque delivery shaft positioned near the vertex of the angle between said panes, a walking beam connected to said driving means and with its ends extending respectively over said panes for arcuate reciprocating movement across said panes and adapted to have limited rocking movement relative to the shaft in a plane longitudinal both to the shaft and the walking beam, wiper blades secured to the opposite ends of the walking beam and positioned respectively on the panes for wiping thereacross, and means for resiliently pressing the wiper blades against said panes respectively.

4. A window wiper for a rear double window in an automobile having closely spaced panes with their surfaces at an angle and a narrow mullion between which comprises a flexible shaft, a flexible housing therefor, a slotted coupling on the end of the flexible shaft and a threaded coupling on the end of the flexible housing, a tubular housing threaded at one end for reception of said threaded coupling and provided with means at the other end thereof for engaging the exterior of the body adjacent a window to clamp the tubular housing in fixed position thereon, a flat narrow strip shaft therein of thickness adapted to fit into said slotted coupling and of width adapted to fit approximately the bore of said tubular housing and a window wiping device mounted on one end of said strip shaft, at least a part of the flat strip portion of said shaft and the adjacent portion of the tubular housing being uniform from one end thereof for a substantial distance.

5. A wiper for automobile rear windows as defined in claim 4, in which the slotted coupling is of diameter no greater than the inside diameter of the tubular housing in said uniform portion thereof and extends beyond the end of the flexible housing.

6. In an automobile which has dual rear windows with a mullion between, and which has a compartment within said automobile below said rear windows and separated therefrom by a shelf, the combination therewith of a wiper mechanism which comprises a shaft through said mullion, a walking beam pivotally attached to the outer end of said shaft, and squeegee blades attached one to each end of said walking beam and adapted to rub against the windows when the walking beam moves, an oscillating motor in the compartment, and a flexible shaft passing through a hole in said shelf and connecting said oscillating motor with the inner end of the shaft passing through said mullion.

JOHN H. HERZOG.